United States Patent [19]

Golde

[11] 3,752,063
[45] Aug. 14, 1973

[54] DOCUMENT DESTRUCTION AND BALING MACHINE

[76] Inventor: Michael Golde, Four Channel Dr., Great Neck, N.Y.

[22] Filed: July 13, 1971

[21] Appl. No.: 162,223

[52] U.S. Cl. .................. 100/97, 100/255, 100/289
[51] Int. Cl. ............................................ B30b 15/08
[58] Field of Search ...................... 100/96, 97, 255, 100/289

[56] References Cited
UNITED STATES PATENTS

| | | | |
|---|---|---|---|
| 2,691,338 | 10/1954 | Robbins | 100/97 |
| 3,643,589 | 2/1972 | Carter | 100/289 X |
| 3,463,079 | 8/1969 | Corbett | 100/255 X |
| 929,960 | 8/1909 | Low | 100/97 X |
| 2,686,466 | 8/1954 | Lee | 100/97 |

FOREIGN PATENTS OR APPLICATIONS

| | | | |
|---|---|---|---|
| 165,380 | 11/1964 | U.S.S.R. | 100/97 |

*Primary Examiner*—John Petrakes
*Assistant Examiner*—C. K. Moore
*Attorney*—Donald P. Gillette

[57] ABSTRACT

A baling machine having a hinged side with a paper shredding mechanism supported thereon to be movable into closed and open positions to form an openable, cylindrical container for receiving and compressing shredded paper and permitting wires to be wrapped around a compressed bale of such paper and the bale to be removed.

1 Claim, 4 Drawing Figures

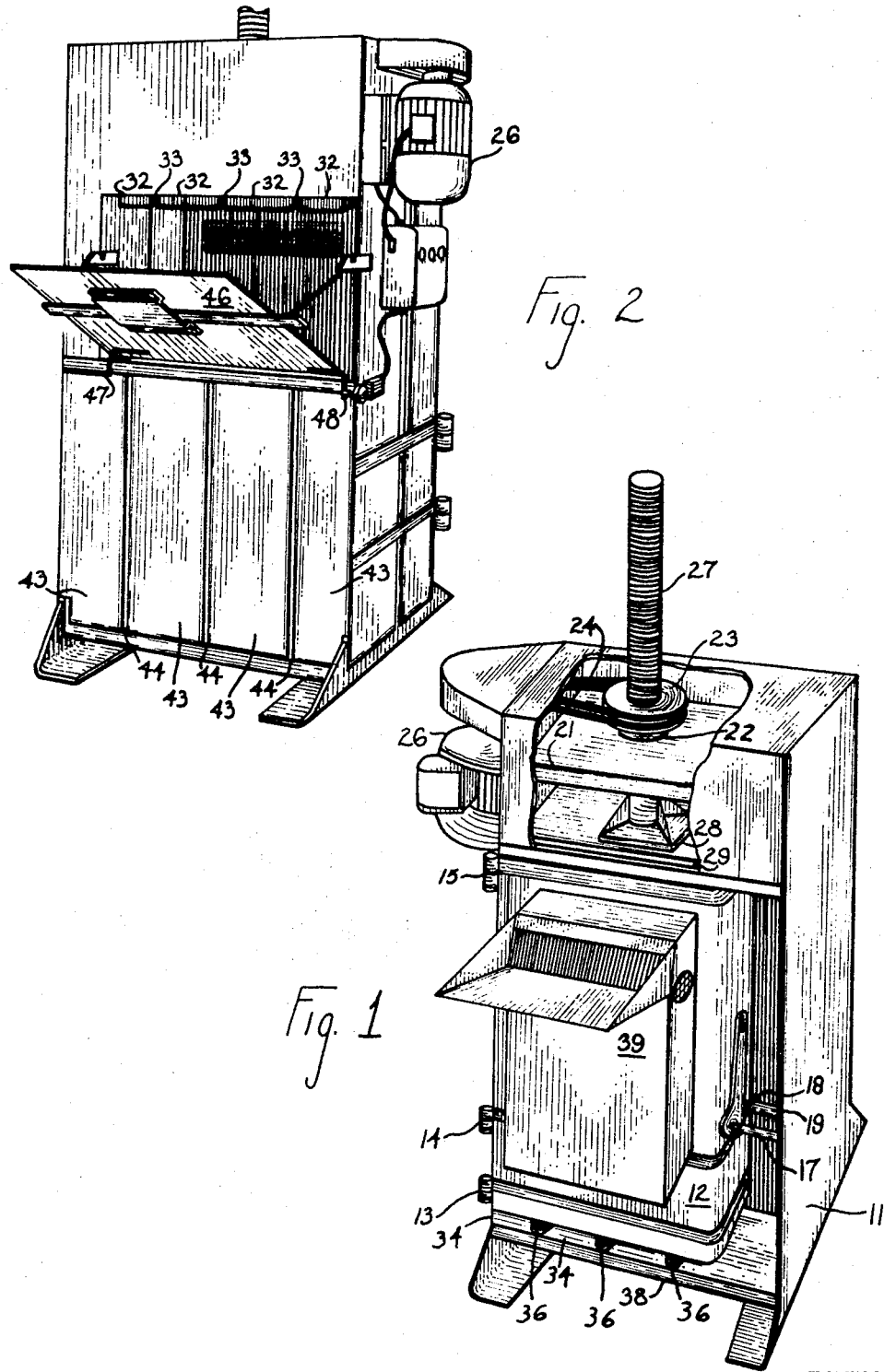

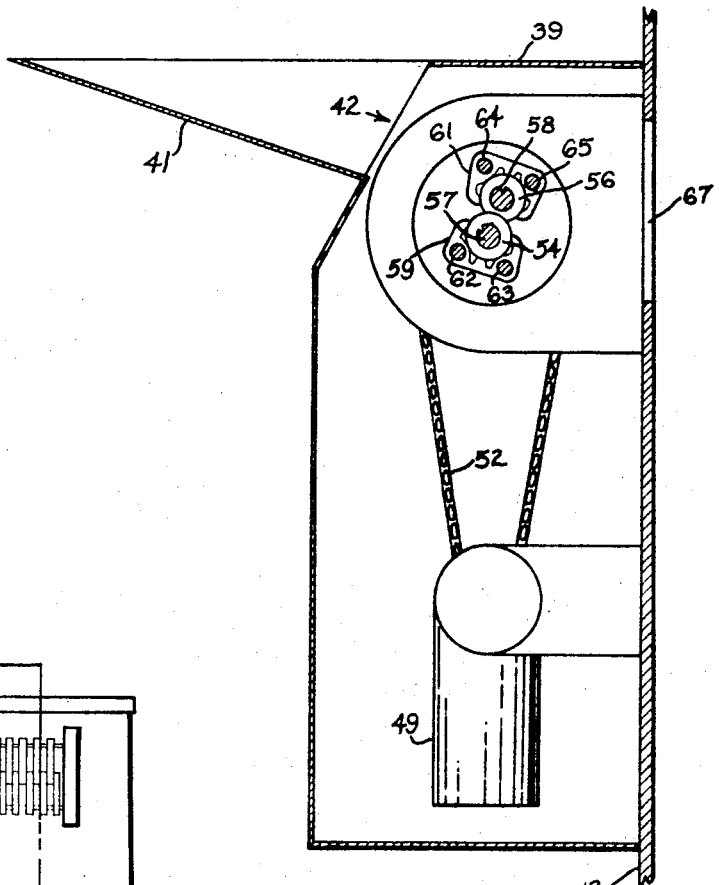
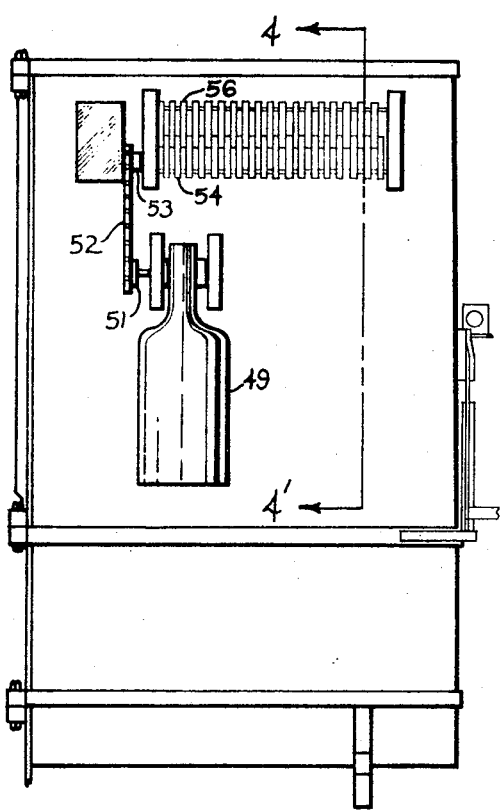

DOCUMENT DESTRUCTION AND BALING MACHINE

FIELD OF THE INVENTION

This invention relates to the field of security document disposal apparatus and particularly to means for efficiently and compactly destroying documents and removing the destroyed documents in compressed bale form.

BACKGROUND OF THE INVENTION

It has long been a requirement of offices dealing with documents that must be kept secret or confidential, whether for military or business purposes, that such documents be physically destroyed on the premises and not simply placed whole in trash containers. Companies have been known to buy the waste paper of their competitors from trash disposal enterprises that pick up that waste paper, supposedly for disposal. In this way the purchasers can learn a great deal about such competitors' operations.

To prevent this, shredding machines have been used to shred or chop or otherwise physically reduce the waste paper to pieces that cannot be recombined easily, if at all, before being turned over to trash disposal people. However, this shredded or chopped paper emerges from the shredder as a stream of individual, loose bits, and this type of waste from a large and busy office dumped loosely into paper disposal bags presents an expensive disposal problem, because disposal companies normally charge a fee to remove such bags from the premises and deliver them to an incinerator or other location for further destruction. While waste paper can be recycled through a paper mill into new paper, the volume of shredded paper placed loosely in a bag of the type just described is so small and the volume of air so large that it has not heretofore been economically justifiable to transport the shredded paper to a mill. Other means of disposal have been used, but these do not have the ecological advantage of recycling the material. Such alternatives include incineration, dumping, burial, or wet pulverization of the waste paper. All of these means require some expenditure, whether carried out by the company that wants to dispose of its waste paper or by the disposal company, which is why disposal companies must charge for their services.

More importantly, there is an increasing tendency by society as a whole to insist that all products, if at all possible, be recycled into the economy since the destruction and disposal of solid waste material is expensive and in fact is becoming almost impossible in some locations. Dumps and other disposal areas are either becoming filled up or are being declared by governmental proclamation to be unavailable for further use. Incineration produces much air pollution, and the slurry from wet pulverization, when allowed to flow into a river, produces intolerable pollution of the water. The expense to various levels of government of coping with ecological problems caused by waste disposal has also raised the strong possibility that extra taxes to pay for disposal will be imposed on any product that is not recycled.

It is, therefore, one object of the present invention to provide means for destroying waste paper and, at the same time, baling it into compact bundles that can be economically handled for recycling.

Baling machines are known to be capable of compressing paper into compact bundles that can be tied up by wires. These bundles have a high enough specific gravity, i.e., ratio of paper to air, to make it economically worthwhile for them to be shipped to a paper mill for recycling. Disposal companies can make money selling baled paper to paper mills and will, therefore, remove bales of paper free of charge from the premises of the company that bales its own waste paper or will even pay something for the bales. Heretofore, baling machines have been used with unshredded paper and the paper has had to be carried some distance in a loose form before being fed into a baling machine. This is not acceptable to security offices, and the present invention comprises a machine with cooperating elements that provide for shredding and baling waste paper in, or close to, the originating office in one operation.

Other objects will become apparent from the following specification and drawings.

BRIEF DESCRIPTION OF THE INVENTION

The invention comprises a machine have a plate driven by a gear motor to move in a vertical direction from a position near the top of the machine to a position near the bottom. The machine is provided with a front door pivoted on one side to swing about a vertical axis and having means to lock it into a closed position to form one side of a channel fitting fairly closely around the plate. The machine also has fixed walls that complete the lower back part of the channel. A back door, which is hinged about a horizontal axis, is located at the upper end of the fixed wall portions to allow non-confidential material to be introduced in unshredded form into the upper end of the channel.

A mechanism comprising walls, a gear motor, and internal shredding blades is rigidly attached to the front door. The upper one of these latter walls has an opening to receive sheets of paper to be disposed of, and this opening is so positioned as to direct the paper into the shredding blades which shred the paper into small strips and feed it directly into the channel beneath the plate. After a sufficient quantity has built up in the lower part of the channel or a sufficient quantity of unshredded material introduced by way of the horizontally pivoted door, the main driving motor is energized. This motor is connected by a transmission belt system to a feed screw which controls the vertical movement of the pressure plate and drives the latter downward to compact the shredded or unshredded paper against the bottom of the machine. By means of a special electrical control, if the bale is not compressed enough for a good compact bald, the pressure plate will automatically return to its top position allowing more paper to be introduced into the baling area. When the pressure plate is driven down onto the paper with sufficient pressure to make a suitably compressed bale, the motor drive will automatically cut off. The front door can then be opened while the pressure plate presses firmly down on the paper. The bottom, the pressure plate, and the rigid walls have slots facing the compacted paper to receive wire to hold the paper in its compressed configuration. After wires have been wrapped around the bale, the pressure plate is retracted by reverse operation of the drive motor. Thereafter the baled paper can be removed via the open front door, which must then be reclosed and latched. Instead of having to pay to have such compacted material removed, it is now possible to sell the material because its economic value has been increased by the baling process without compromising the secrecy of the documents. In addition, shredding the material before baling it permits it to be compressed into the most compact bales, which further improves its economic value.

BRIEF DESCRIPTION OF THE DRAWINGS

FIG. 1 is a perspective view of a combined baling and shredding machine constructed according to the invention;

FIG. 2 is a perspective view of the rear of the machine in FIG. 1;

FIG. 3 shows the shredding apparatus in the machine of FIG. 1; and

FIG. 4 is a cross-sectional view along the line 4—4' of the shredding apparatus of FIG. 3.

DETAILED DESCRIPTION OF THE INVENTION

The machine in FIG. 1 comprises a frame 11 having a door 12 attached thereto by several hinges 13-15. In order to use specific terms in describing the invention, the door 12 will be referred to as the front door of the apparatus. On the side of the door opposite the hinges 13-15 is a latching mechanism comprising a handle 17 and a latch 18 that engages a bar 19 rigidly attached to the frame 11.

At the top part of the frame 11 is a closed portion that contains a support 21 for a thrust block 22. The latter supports a pulley 23 which is coupled by means of several V-belts 24 to a smaller pulley (not shown) on the shaft of a motor 26. The motor is mounted on the side of the frame 11. The thrust block 22 comprises a nut that engages a feed screw 27 which is attached by means of a table block 28 to a table, or pressure plate, 29. The upper part of the pressure plate is a rigid sheet of steel. The lower surface of the pressure plate is thinner sheet metal bent so as to form several slats 32. These slats are separated from each other by relatively small slots 33 for a purpose to be described hereinafter.

At the lower end of the frame 11 and below the door 12 is a base comprising another plurality of slats 34 equal in number to the slats 32 and separated from each other by a series of slots 36 which are aligned with the slots 33. Below the slats 34 is the floor 38 of the frame 11.

The shredding apparatus is attached to the front door 12 and is enclosed by a cover 39. Near the upper edge of the cover is an inclined guide 41 on which is placed waste paper that is to be shredded and baled. The cover has an opening 42 in line with the guide to allow the paper to slide, or to be fed, directly into internal shredding means inside the cover and then into the interior of the baling portion of the machine.

The back side of the machine in FIG. 1 is shown in FIG. 2. The feed screw 27 is at the top of its range of travel. The back wall of the machine is separated into several vertical plates 43 equal in number to the slats 32 and 34 and spaced apart to leave a series of slots 44 aligned with the slots 33 and 36. The plates 43 only go about half way up the back side of the apparatus. Above the upper end of the plates 43 is a back door 46 attached to hinges 47 and 48 which have a horizontal axis about which the door 46 can be pivoted open to permit additional, non-confidential material to be fed into the back side of the machine without having to be shredded.

The shredding apparatus is shown in FIGS. 3 and 4. In FIG. 3 only the door 12 is illustrated. The cover over the shredding apparatus has been removed to show the internal components which include a gear motor 49 connected to a sprocket 51 which drives a sprocket chain 52. This chain is connected to a driven sprocket 53 that actuates two sets of cutting wheels 54 and 56. These wheels have finely serrated sharp edges so that they are capable of slicing paper into narrow strips.

The shredding apparatus is also shown in cross-section in FIG. 4. In this view the cover is shown attached to the door 12. The opening 42 of the cover is in line with the intersection between the cutting wheels 54 and 56 so that paper placed on the inclined guide 41 slides directly into the cutting wheels. The wheels are mounted on shafts 57 and 58 which are driven by the motor 49 and in order to space adjacent pairs of cutters 54 and 56 by the proper distance, sets of spacers 59 and 61 are placed between them. These spacers are mounted on four rods 62-65 to hold them rigidly in place. Waste paper that has passed between the cutters 54 and 56 is fed directly through a slot 67 in the door 12 and thence into the baling portion of the machine.

In operation, the material to be baled is fed into the machine either through the slot 42 or through the back doorway. The material that enters through the back doorway is not shredded but is baled whole. In the process, it is subjected to very little permanent destruction, and therefore, confidential information in the form of written documents should be fed into the machine only through the slot 42. Material fed through the slot 42 is shredded by the cutting wheels 54 and 56 before being passed along into the vertical channel defined by the doors 12 and 46, the sides of the frame 11, and the plates 43 at the back.

After a sufficient quantity of waste paper has been fed into the vertical channel, the motor 26 is actuated to rotate the pulley 23 and rotate the nut that controls the feed screw 27 to force the feed screw and the pressure plate 29 downward. This compresses the material between the pressure plate and the slats 34 at the bottom of the channel. The vertical walls of the channel, i.e., the frame 11, the door 12, and the fixed plates 43, hold the material in place under pressure.

Normally, the amount of material fed into the machine prior to the initial compression is not enough to form a usable bale, and so the motor 26 must be reversed to bring the feed screw 27 and the pressure plate 29 back up to the top of the machine, above the cutting wheels 54 and 56 and the back door 42. Additional material may then be fed into the machine, and, as in the case of the first batch, it may be fed in via the slot 42 or the back doorway. The process of feeding and compressing may be repeated as many times as necessary to produce a bale of the proper size.

In order to tie up the bale, the door 12 must be opened to expose the compressed material. Once the door is open, it is possible to feed a length of wire through each of the slots 33 in the lower surface of the pressure plate and through the matching slots 44 between the vertical plates 43 in the back of the machine and then through the corresponding slots 36 in the base of the machine. The ends of the wires are then firmly twisted together to keep the material compressed after the pressure plate 29 has been raised again to allow the bale to be removed and disposed of.

What is claimed is:

1. Apparatus for document disposal comprising:
A. A vertical frame;
B. A motor supported on said frame;
C. A substantially horizontal pressure plate within the space enclosed by said frame;
D. A feed screw connected to the upper surface of said plate:
E. Driving means connecting said motor to said screw to drive said screw and plate in a vertical direction when said motor runs;
F. A fixed back portion on said frame;
G. A door hinged to said frame to pivot with respect to said frame, said door, said frame, and said back portion defining a vertical channel, said pressure plate having a perimeter substantially conforming to the inwardly facing walls of said channel; and
H. Shredding means mounted on said door to pivot therewith and comprising:
1. a second motor,
2. a rotary support attached to said second motor to be rotated thereby,
3. a plurality of cutting blades attached to said support to rotate therewith,
4. a cover enclosing said blades and
5. a slot in said cover adjacent said blades whereby papers inserted into said slot are shredded by said blades and the resultant shredded material is directed into said vertical channel.

* * * * *